Jan. 24, 1967    R. T. SMITH, JR., ET AL    3,299,906
PEAKING VALVE SYSTEM
Filed March 20, 1964

INVENTORS
**ROBERT T. SMITH JR.
TREVOR D. READER**
BY
*Griffin and Stokes*
ATTORNEYS

United States Patent Office 3,299,906
Patented Jan. 24, 1967

3,299,906
PEAKING VALVE SYSTEM
Robert T. Smith, Jr., Hatboro, and Trevor D. Reader, King of Prussia, Pa., assignors to Sperry Rand Corporation, New York, N.Y., a corporation of Delaware
Filed Mar. 20, 1964, Ser. No. 353,676
16 Claims. (Cl. 137—593)

This invention relates to a fluid pressure peaking system, and more particularly, to a fluid valving device capable of generating square wave fluid pulses at higher repetition rates.

The present invention concerns an increase in operating speed of a fluid switching system which is best, although not exclusively, incorporated into a spool valve assembly. The prior art has brought forth a host of devices all of which are limited to an extent by the inherent non-linear characteristics of filling a chamber with fluid. Said filling characteristics may be compared to the way in which a capacitor receives and stores its electric charge. In like manner, the closer the chamber is to being filled, the slower the filling process due to the continual decay of the pressure differential across the system. This disadvantage of prior art devices is particularly noticed in the pneumatic tape capstan field wherein pressure differentials are created across the tape in order to govern its motion by the rotating capstan. In essence, the basic novel concept of the present invention involves the provision of a relatively high pressure fluid source which is selectively connected to utilization means through an intermediate fluid storage chamber, whose pressure in turn varies between the said high pressure value and a lower operating pressure value because of a restricted communication between it and said high pressure source. Additionally, the substitution of full communication for restricted communication between the intermediate storage chamber and the high pressure source at a time when the former is disconnected from the utilization means provides rapid peaking of the intermediate chamber pressure to the higher pressure in preparation for a subsequent phase of operation.

Therefore, one object of the present invention is to automatically provide different effective fluid pressure values during transient and steady state operating conditions of utilization means.

A further object of the present invention is to increase the speed of fluid pressure switching in a spool valve by operating at a higher level of positive pressure (or vacuum) during the transitory acceleration or deceleration phase than is required for steady state condition.

More specifically, it is an object of the instant invention to provide a pressure changing system wherein the change in pressure describes a path of large inital slope which thereafter has an abrupt drop-off as a steady state condition is reached.

These and other objects of the present invention will become apparent during the following description to be read in view of the drawings, in which.

Figure 1:
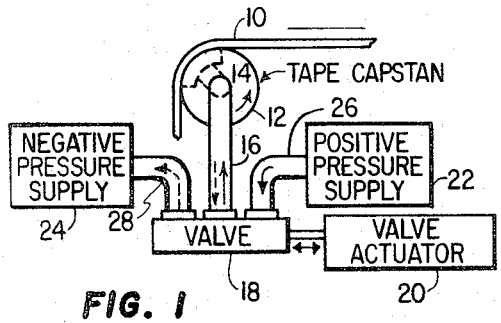
FIGURE 1 illustrates a tape captsan environment in which the invention finds particular use.

Referring first to FIGURE 1, a tape capstan environment is illustrated wherein the present invention finds particular although not exclusive use. A magnetic storage tape 10 is to be accelerated or decelerated on a constant speed capstan member 12 which in turn rotates about a stationary plenum chamber 14 located at the interior of capstan 12. Capstan 12 contains a plurality of ports in its surface which successively register with plenum 14 so as to transfer the plenum pressure through the capstan to the underside of tape 10. If tape 10 is located in the atmopshere, then a plenum pressure lower than atmospheric will produce a first pressure differential across tape 10 so as to force it into contact with the rotating capstan 12 whereupon motion is imparted to the tape in the direction of the arrow. On the other hand, where the plenum pressure is equal to or greater than atmospheric, a second pressure differential of opposite polarity forces tape 10 away from the rotating surface of capstan 12 so as to stop tape motion. Plenum chamber 14 in turn is connected via a channel 16 to the valve 18 which can be selectively actuated by a means 20 in order to establish either positive or negative pressure in plenum 14 relative to the tape environmental pressure. Positive and negative pressure supply sources 22 and 24, such as pumps, are respectively connected as inputs to valve 18.

Figure 2:
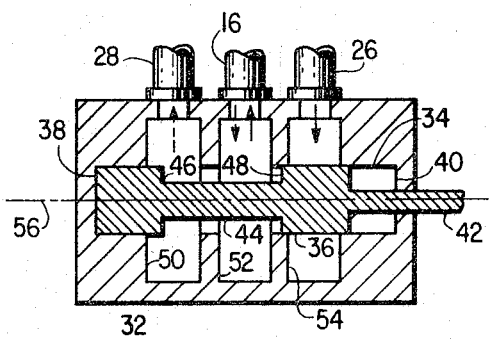
FIGURE 2 illustrates a prior art spool valve.

A better appreciation of the advantages of the present invention may be obtained by first considering the prior art. As regards valve element 18 in FIGURE 1, a typical well known valve of the spool type is shown in FIGURE 2. This valve is comprised of a housing 32 having an elongated chamber 34, generally cylindrical, in which slides a piston member 36 between ends 38 and 40 of chamber 34. Piston 38 is mechanically connected by a rod 42 with an external valve actuator 20 such as shown in FIGURE 1, said rod 42 extending through an opening in end 40 of chamber 34. Piston member 36 itself has an annular groove 44 located at its central portion between end lands 46 and 48. The side wall of chamber 34 also has three annular grooves 50, 52, and 54 which are axially spaced along the chamber longitudinal axis 56. These grooves 50, 52, and 54 in effect form chambers which may be selectively connected one to another according to the axial position of piston 36 within chamber 34. The axial width of groove 44 is so related to the widths and axial spacing of grooves 50, 52, and 54 that when piston 36 is in its left-most position as shown in FIGURE 2, the right end land 48 seals groove 54 from groove 52 wile groove 50 communicates with groove 52 through the space between groove 44 and the side wall of chamber 34. Conversely, for a right-most piston position, grooves 52 and 54 communicate with each other while groove 50 is sealed from groove 52. Groove 52 is connected via channel 16 with plenum chamber 14 in FIGURE 1, while grooves 50 and 54 respectively communicate with the negative pressure supply 24 and the positive pressure supply 22 via respective channels 28 and 26. Consequently, by positioning piston 36 in either of its two end-most locations, either the negative supply 24 or the positive supply 22 may be connected with plenum 14. The time required to switch from one plenum pressure (for example, a negative pressure less than atmospheric) to the other (positive) plenum pressure is illustrated by curve A in FIGURE 3. It is here assumed that the negative pressure supply 24 in FIGURE 1 of a prior art system creates a vacuum of −6 units in groove 50 which is communicated without substantial change to plenum chamber 14. By now moving piston 36 to the right, the negative pressure supply 24 is blocked from communication with groove 52 which now communicates via groove 54 with the positive pressure supply 22. In order to prevent an intolerable condition of tape blow-off whenever the plenum pressure is positive, prior art capstans are limited to a rather low positive pressure supply 22 here assumed to be +2 units. However, the plenum pressure does not instantaneously change from −6 units to +2 units but instead follows curve A in FIGURE 3. The reason that an instantaneous pressure change is impossible is due to the fact that a certain finite time is required for positive pressure supply 22 to transmit fluid particles to plenum 14 in order to increase the pressure therein. The time required for the plenum pressure to rise from −6 units to atmospheric (0) pressure while on its way +2 units can be represented by $T_1$ in FIGURE 3. $T_1$ therefore represents the time delay after piston 36 is moved to the right before tape 10 is forced away from the rotating capstan. Consequently, there is a certain response lag at capstan 12 due to the fact that it is impossible to immediately change plenum pressure.

Figure 3:
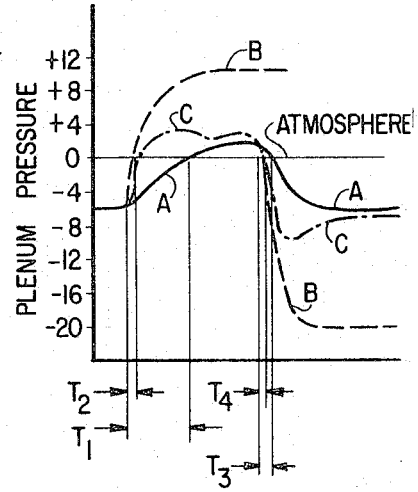
FIGURE 3 illustrates pressure change curves of both the prior art and the present invention.

By increasing the positive pressure supply 22 to a higher value of, for example, 10 units the change of pressure curve in FIGURE 3 becomes steeper in a manner illustrated by curve B. An increase in the slope of the change of pressure curve reduces the time required for the plenum chamber pressure to reach the zero or (atmospheric) value so as to reduce the time lag between piston positioning and capstan response. For curve B, this time lag is represented by $T_2$ which is considerably less than $T_1$. However, such a high positive pressure supply 22 also produces a steady state plenum pressure in a prior art system which may be higher than that necessary or even desirable for certain utilization means. In other words, a large positive (or negative) pressure supply may only be desirable during the transient condition initially occurring at the time that piston 36 is shifted from one position to the other so as to cause a more rapid change in plenum pressure rather than a higher (or lower) operating pressure. What has been described in connection with a change in plenum pressure from negative to positive values also is true for a change from positive to negative values. For example, FIGURE 3 further shows that for a desired steady state negative plenum pressure of −6 units, the prior art system source 24 would supply fluid of about −6 units pressure to valve 18 which in turn would cause a response time lag of about $T_3$. If the prior art source 24 were instead supplying fluid at a lower pressure of, for example −20 units, then a shorter response time lag $T_4$ is obtained at the expense of having a possibly undesirable steady state negative plenum pressure of around −20 units.

Figure 4:
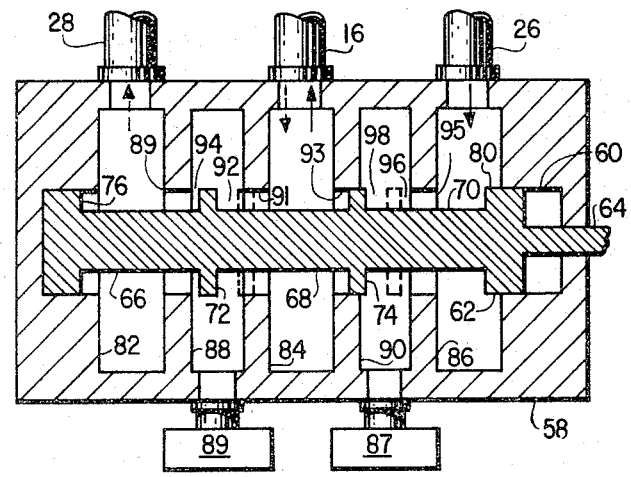
FIGURE 4 illustrates certain details of the present invention as incorporated in a spool valve.

The present invention increases the speed of switching by operating at a fairly high level of positive pressure (or vacuum) only during the transitory acceleration or deceleration phase of the tape. After the transient phase is over, the high positive or negative pressure reverts to a normal operating steady state level so as to prevent either too great a blow-off or suction pressure differential from being applied across tape 10. This requires not only a readjustment of the prior art fluid source pressures relative to the desired steady state plenum pressures, but also the provision of novel fluid storage chamber means and fluid flow regulating means interposed between said sources and the plenum chamber, with the volumes of said storage chamber means and plenum chamber relative to the flow rates through the system being such as to obtain the desired results. Referring now to FIGURE 4, there is illustrated a novel spool valve which may be used as element 18 in the combination of FIGURE 1 in order to provide said storage chamber and fluid regulating means. By use of this valve in conjunction with the other system parameters, the change in plenum pressure follows the dot-dash curve C in FIGURE 3 wherein the initial temporary slope or rate of change is quite large as in the case of curve B, but during steady state condition the desired plenum pressure is maintained. A housing 58 has a central elongated chamber 60 generally cylindrical, in which slides a piston member 62 between left and right-hand end positions. Piston 62 is moved by rod 64 connected to a valve actuator member 20 as in FIGURE 1. Piston 62 has formed therein three axially spaced annular grooves 66, 68, and 70 which are separated by center lands 72 and 74. Lands 76 and 80 are also at the ends of the piston. The side wall of chamber 60 contains three annular grooves 82, 84, and 86 which are respectively connected via respective conduits 28, 16, and 26 with the negative pressure supply 24, the plenum chamber 14 and the positive pressure supply 22 of FIGURE 1. Chamber 60 further contains an annular groove 88 located between grooves 82 and 84 and separated therefrom by respective side wall lands 89 and 91. A second chamber annular groove 90 is located between grooves 84 and 86 and separated therefrom by respective sidewall lands 93 and 95. Each of these two grooves 88 and 90 should have an effective volume which is large enough with respect to the plenum or other utilization chamber so as to initially act as substantially constant fluid pressure source when full fluid communication is first established therewith, yet small enough to be depleted of much of its fluid during steady state operation when there is also restricted fluid flow between it and an external fluid source. Where the thickness of the cylinder wall is not sufficient to provide enough fluid storage capacity in grooves 88 and 90, external auxiliary fluid storage chambers 89 and 91 may be respectively connected therewith.

Other relative dimensions of the valve in FIGURE 4 are such that for the left-most piston position shown in FIGURE 4, groove 88 communicates with groove 84 through a relatively large opening 92 formed between center land 72 and land 91. Communication is also effected between groove 88 and groove 82 through a much smaller opening 94 which exists between center land 72 and land 89. In other words, center land 72 is much closer to land 89 than it is to land 91 for said piston position. The actual flow areas of openings 92 and 94 should be such relative to one another, that the pressure existing in groove 88 is substantially less negative (more positive) than the negative pressure groove 82, while the pressure in groove 84 is substantially equal to the pressure in groove 88. To put this another way, opening 94 acts as a restriction in the comunicating channel between grooves 82 and 88 such that there is substantial pressure loss therethrough during steady state operation, whereas opening 92 is of sufficient size to prevent any substantial difference in the pressures existing in grooves 84 and 88. On the other hand, center land 74 is opposite land 93 so as to block communication between groove 90 and groove 84, while complete communication is established between grooves 90 and 86 so that the positive supply pressure of relatively high value is rapidly established in grooves 90 and 86 so that the positive supply pressure of relatively high value is rapidly established in groove 90 as soon as piston 62 moves to the left. As is plainly seen in FIGURE 4, there is substantially no restriction to fluid flow between grooves 90 and 86 for said left-most piston position.

When piston 62 is moved to the right, an opposite condition prevails with respect to the negative and positive pressures. Center land 74 is now located at the dotted line position shown in FIGURE 4 aligned with groove 90 and quite close to land 95 so as to create a restricted opening 96 between grooves 90 and 86. A substantially large flow opening 98 is created between land 74 and land 93 so as to afford substantially full, lossless communication between grooves 90 and 84 such that the pressure in each is about the same for steady state condition. However, due to the smaller restricted opening 96, the positive pressure in groove 90 is substantially less during steady state condition than the positive pressure supply existing in groove 86.

Figure 5A:
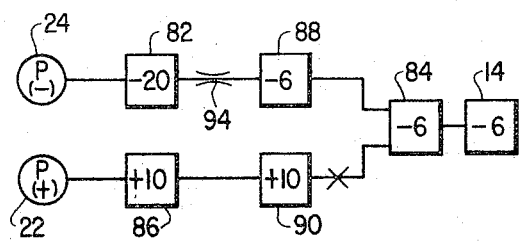
FIGURES 5A and 5B diagrammatically illustrate the effective interconnections between elements in the system.
Figure 5B:
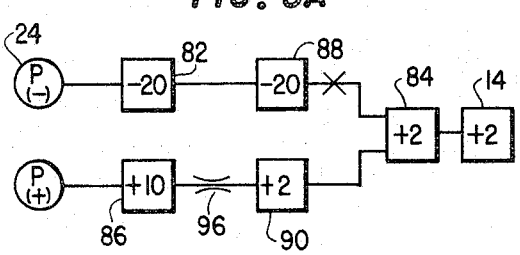

The operation of the present invention will now be described with particular reference to FIGURE 3 and FIGURES 5A and 5B. FIGURE 5A diagrammatically illustrates the interconnections between the various side wall grooves or chambers of FIGURE 4 as well as specifying the assumed operating pressures found in each chamber when piston 62 is at its left-most position. FIGURE 5B diagrammatically illustrates assumed pressures and interconnections when the piston is in its right-most position. It is assumed for the purpose of this discussion that the negative pressure supply source 24 is a pump which keeps a negative pressure vacuum of −20 units in groove 82, while the positive pressure supply source 22 is a pump keeping a positive pressure of +10 units in groove 86. The sizes of grooves 82 and 86 and their connections to the pumps may be made such that their respective pressures do not appreciably vary no matter what the flow rate of fluid into or out of them during either steady state or transient conditions. Consequently, pump 24 and grooves 82 together may be considered as a substantially constant vacuum pressure source, whereas pump 22 and groove 86 may be considered as a substantially constant positive pressure source. Furthermore, elements 88 and 90 in FIGURES 5A and 5B would include all auxiliary fluid storage chambers if such are required. Assume first that piston 62 has been in its left-most position for a period of time sufficient to insure a steady state operating condition. Groove 88 communicates through a relatively large opening 92 with groove 84 which in turn is connected through a relatively large channel 16 to plenum chamber 14. These connections between grooves 88 and 84, and groove 84 and plenum 14 are ones whereby there is assumed to be no substantial pressure loss due to fluid flow. However, the flow through the restricted opening 94 between grooves 88 and 82 causes the former to have a substantially less negative pressure (here assumed to be −6 units) than does the latter (here assumed to be −20 units). Groove 90 is completely blocked from communication with groove 84, with this blocked condition being represented by an X in FIGURE 5A. Because there is no steady state flow through grooves 86 and 90, both have pressures equal to the positive supply pressure of +10 units. For such a steady state condition the plenum pressure is about −6 units which is sufficient to provide enough force across tape 10 to securely force same against the rotating tape capstan but without undue adhesion which might prove detrimental in operation.

Now assume that piston 62 is moved to the right so as to block communication between grooves 88 and 84 while at the same time providing full communication between grooves 90 and 84. This right-most piston position further provides full communication between grooves 88 and 82, but only restricted communication between grooves 90 and 86. Upon the instant of piston change, which is assumed to be time zero in FIGURE 3A, then the existing +10 unit pressure in groove 90 acts as the positive supply source to rapidly cause the plenum pressure to increase along the curve C in FIGURE 3A beginning from the −6 unit value. The slope of the initial portion of curve C is thus about equal to the slope of previously described curve B, since a +10 unit pressure is initially available as a supply to groove 84. Consequently, only a relatively short time $T_2$ elapses before the plenum pressure is equal to a predetermined threshold pressure value (here assumed to be atmospheric pressure) whereupon tape blow-off occurs. However, the volume of groove 90 is still small enough relative to the volume of the utilization chamber and the full and restricted flow rates such that the pressure initially existing therein at the instant of piston switching eventually and significantly decays from its peak value of +10 units to an assumed value of +2 units due to the fact that restriction 96 causes a pressure loss on fluid flow therethrough. After a steady state condition prevails (FIGURE 5B), the +2 unit pressure in groove 90 is communicated to plenum chamber 14 via groove 84. Curve C shows that there may be a plenum pressure greater than +2 units for a short period of time after piston switching, however, this transient pressure is not detrimental to the tape system operation.

At the time when piston 62 is moved to its right-hand position, the restriction 94 between grooves 82 and 88 is effectively removed so that the pressure in the latter rapidly becomes equal to that in the former (here assumed to be −20 units). When the piston is subsequently returned to its left-most position, an initial high vacuum of −20 units is available as a source to plenum 14 so as to make large the initial slope of the plenum pressure change as it goes from a +2 unit value down to a negative value of −6 units for steady state condition. Furthermore, when the piston is moved to its left-most position, restriction 96 between grooves 86 and 90 is removed so as to allow the pressure in the groove 90 to rapidly peak to a +10 unit value in preparation for a subsequent return of the piston to its right-most position. Consequently, the novel system arrangement allows not only a variable pressure supply to be effectively connected to the plenum, but also permits a rapid peaking of that pressure supply during the time when it is not in use. This means that the preferred embodiment of the present invention, which also incorporates novel valve structure as exemplified by the spool valve of FIGURE 4, is capable of operation at an extremely high repetition rate.

Although the present invention is shown to have particular use in a pneumatic tape capstan system, there are obviously many other environments in which rapid switching, coupled with low steady state operating pressures, is desirable. Furthermore, the broad novel system function as represented in FIGURES 5A and 5B can also be performed with means other than the novel spool valve configuration of FIGURE 4. Therefore, it is apparent that modifications may be made by those skilled in the art without departing from the principles of the invention as defined in the appended claims.

The embodiments of the invention in which an exclusive property or privilege is claimed are defined as follows:

1. A fluid pressure peaking system which comprises:
   (a) a fluid utilization chamber restrictively communicating with fluid of a predetermined first pressure value;
   (b) a source of fluid having a substantially constant second pressure value different from said first pressure value;
   (c) a fluid storage chamber having a first opening connected with said fluid source and a second opening connected with said utilization chamber; and
   (d) fluid flow regulating means selectively actuable to either a first or a second state to permit either full or restricted fluid flow through said first opening, respectively, and either no or full fluid flow through said second opening, respectively, with the volumes of said storage chamber and said utilization chamber relative to the magnitudes of said full and restricted fluid flows being such that said storage chamber temporarily acts as a source for said utilization chamber of fluid at substantially said second pressure value when said fluid flow regulating means is initially actuated from its said first to its said second state until such time as when the pressure in said utilization chamber at least reaches a predetermined threshold pressure value, after which said storage chamber finally acts as a source for said utilization chamber of fluid at substantially a steady state pressure value which is different from said second pressure value.

2. A system according to claim 1 wherein said steady state pressure value is intermediate said first and second pressure values.

3. A system according to claim 1 wherein said second pressure value is larger than said first pressure value.

4. A system according to claim 1 wherein said second pressure value is smaller than said first pressure value.

5. A system according to claim 1 wherein said utilization chamber is situated in and communicates with an atmospheric environment, and further has associated therewith movable web capstan means.

6. A fluid pressure peaking system which comprises:
(a) a fluid utilization chamber restrictively communicating with fluid of a predetermined first pressure value;
(b) a first source of fluid having a substantially constant second pressure value larger than said first pressure value;
(c) a first fluid storage chamber having a first opening connected with said first fluid source and a second opening connected with said utilization chamber;
(d) first fluid flow regulating means selectively actuable to either a first or a second state to permit either full or restricted fluid flow through said first opening, respectively, and either no or full fluid flow through said second opening, respectively, with the volumes of said first storage chamber and said utilization chamber relative to the magnitudes of said full and restricted fluid flows being such that said first storage chamber temporarily acts as a source for said utilization chamber of fluid at substantially said second pressure value when said first fluid flow regulating means is initially actuated from its said first to its said second state until such time as when the pressure in said utilization chamber at least reaches a predetermined first threshold pressure value, after which said first storage chamber finally acts as a source for said utilization chamber of fluid at substantially a first steady state pressure value which is different from said second pressure value;
(e) a second source of fluid having a substantially constant third pressure value smaller than said first pressure value;
(f) a second fluid storage chamber having a third opening connected with said second fluid source and a fourth opening connected with said utilization chamber;
(g) second fluid flow regulating means selectively actuable to either a first or a second state to permit either full or restricted fluid flow through said third opening, respectively, and either no or full fluid flow through said fourth opening, respectively, with the volumes of said second storage chamber and said utilization chamber relative to the magnitudes of said full and restricted fluid flows being such that said second storage chamber temporarily acts as a source for said utilization chamber of fluid at substantially said third pressure value when said second fluid flow regulating means is initially actuated from its first to its said second state until such time as when the pressure in said utilization chamber at least reaches a predetermined second threshold pressure value, after which said second storage chamber finally acts as a source for said utilization chamber of fluid at substantially a second steady state pressure value which is different from said third pressure value; and
(h) selectively operable control means for actuating said first fluid regulating means to its said first or said second state while actuating said second fluid regulating means to said second or said first state, respectively.

7. A system according to claim 6 wherein said first steady state pressure value is intermediate said first and second pressure values.

8. A system according to claim 6 wherein said second steady state pressure value is intermediate said first and third pressure values.

9. A system according to claim 6 wherein said first steady state pressure value is intermediate said first and second pressure values, and said second steady state pressure value is intermediate said first and third pressure values.

10. A system according to claim 6 wherein said utilization chamber is situated in and communicates with an atmospheric environment, and further has associated therewith movable web capstan means.

11. Valve structure comprising:
(a) an elongated chamber;
(b) a piston located within said elongated chamber and slidable along its longitudinal axis between first and second predetermined positions therein, said piston having first and second axially spaced grooves therein which are separated by a piston center land;
(c) first and second openings in said elongated chamber which are in communication with said first and second piston grooves, respectively, for both of said first and second piston positions; and
(d) a first groove in said elongated chamber defined by first and second axially spaced chamber lands which in turn are located between and are respectively nearer to said first and second chamber openings so as to make the axial width of said chamber first groove substantially larger than the axial width of said piston center land such that for said first piston position said piston center land abuts said chamber second land to thereby seal said chamber first groove from said chamber second opening while simultaneously permitting full communication between said chamber first groove and said chamber first opening, whereas for said second piston position said piston center land is aligned with said chamber first groove but is much closer to said chamber first land than to said chamber second land to thereby permit full communication between said chamber first groove and said chamber second opening while simultaneously permitting only restricted communication between said chamber first groove and said chamber first opening.

12. Valve structure according to claim 11 wherein is further included an auxiliary fluid storage chamber communicating with said chamber first groove.

13. Valve structure comprising:
(a) an elongated chamber;
(b) a piston located within said chamber and slidable along its longitudinal axis between first and second predetermined positions therein, said piston having first and second axially spaced grooves therein which are separated by a first piston center land, and an axially spaced third groove therein separated from said piston second groove by a second piston center land;
(c) first, second, and third openings in said chamber which are in communication with said first, second and third piston grooves, respectively, for both of said first and second piston positions;
(d) a first groove in said chamber defined by first and second axially spaced chamber lands which in turn are located between and are respectively nearer to said first and second chamber openings so as to make the axial width of said chamber first groove substantially larger than the axial width of said piston first center land such that for said first piston position said piston first center land abuts said chamber second land to thereby seal said chamber first groove from said chamber second opening while simultaneously permitting full communication between said chamber first groove and said chamber first opening, whereas for said second piston position said piston first center land is aligned with said chamber first groove but is much closer to said chamber first land than to said chamber second land to thereby permit full communication between said chamber first groove and said chamber second opening while simultaneously permitting only restricted communication between said chamber first groove and said chamber first opening; and
(e) a second groove in said chamber defined by third and fourth axially spaced chamber lands which in turn are located between and are respectively nearer to said second and third chamber openings so as to make the axial width of said chamber second groove substantially larger than the axial width of said piston second center land such that for said second piston position said piston second center land abuts said chamber third land to thereby seal said chamber second groove from said chamber second opening while simultaneously permitting full communication between said chamber second groove and said chamber third opening, whereas for said first piston position said piston second center land is aligned with said chamber second groove but is much closer to said chamber fourth land than to said chamber third land to thereby permit full communication between said chamber second groove and said chamber second opening while simultaneously permitting only restricted communication between said chamber second groove and said chamber third opening.

14. Valve structure according to claim 13 wherein is further included a first auxiliary fluid storage chamber communicating with said chamber first groove, and a second auxiliary fluid storage chamber communicating with said chamber second groove.

15. A fluid pressure peaking system which comprises:
 (a) a fluid utilization chamber restrictively communicating with fluid of a predetermined first pressure value;
 (b) a source of fluid having a substantially constant second pressure value different from said first pressure value;
 (c) an elongated chamber;
 (d) a piston located within said elongated chamber and slidable along its longitudinal axis between first and second predetermined positions therein, said piston having first and second axially spaced grooves therein which are separated by a piston center land;
 (e) first and second openings in said elongated chamber which are respectively connected with said storage chamber and said utilization chamber, said first and second openings further being in communication with said first and second piston grooves, respectively, for both of said first and second piston positions; and
 (f) a first groove in said elongated chamber defined by first and second axially spaced chamber lands which in turn are located between and are respectively nearer to said first and second chamber openings so as to make the axial width of said chamber first groove substantially larger than the axial width of said piston center land such that for said first piston position said piston center land abuts said chamber second land to thereby seal said chamber first groove from said chamber second opening while simultaneously permitting full communication between said chamber first groove and said chamber first opening, whereas for said second piston position said piston center land is aligned with said chamber first groove but is much closer to said chamber first land than to said chamber second land to thereby permit full communication between said chamber first groove and said chamber second opening while simultaneously permitting only restricted communication between said chamber first groove and said chamber first opening, with the effective volumes of said chamber first groove and said utilization chamber relative to the magnitudes of said full and restricted fluid flows being such that said chamber first groove temporarily acts as a source for said utilization chamber of fluid at substantially said second pressure value when said piston is initially moved from its said first position to its said second position until such time as when the pressure in said ultilization chamber at least reaches a predetermined threshold pressure value, after which said chamber first groove finally acts as a source for said utilization chamber of fluid at substantially a steady state pressure value which is different from said second pressure value.

16. A system according to claim 15 wherein said steady state pressure value is intermediate said first and second pressure values.

References Cited by the Examiner
UNITED STATES PATENTS

| | | | |
|---|---|---|---|
| 2,633,324 | 3/1953 | Bierman | 137—625.48 |
| 2,920,651 | 1/1960 | Welsh | 137—625.4 XR |
| 2,974,643 | 3/1961 | Gillham et al. | 137—625.48 XR |
| 3,093,283 | 6/1963 | Hodges | 226—95 |
| 3,152,612 | 10/1964 | Avery | 137—625.4 |
| 3,204,662 | 9/1965 | Williams | 137—625.48 XR |

FOREIGN PATENTS 863,082  3/1961  Great Britain.

M. CARY NELSON, *Primary Examiner.*

S. SCOTT, *Assistant Examiner.*